M. SCHEUER.
ELASTIC LEATHER.
APPLICATION FILED OCT. 4, 1912.

1,183,037.

Patented May 16, 1916.

Attest:

Maurice Scheuer,
Inventor:
by
Robt B Killgore
Atty

UNITED STATES PATENT OFFICE.

MAURICE SCHEUER, OF NEW YORK, N. Y., ASSIGNOR, BY MESNE ASSIGNMENTS, TO AMERICAN BELT CORPORATION, OF NEW YORK, N. Y., A CORPORATION OF NEW YORK.

ELASTIC LEATHER.

1,183,037.   Specification of Letters Patent.   Patented May 16, 1916.

Application filed October 4, 1912. Serial No. 723,896.

*To all whom it may concern:*

Be it known that I, MAURICE SCHEUER, a citizen of the United States, residing in the city, county, and State of New York, have invented a new and useful Improvement in Elastic Leather, of which the following is a specification.

My invention relates to stretchable or elastic leather made by combining leather with an elastic foundation and my object is the production of this material with a uniform adhesion over the entire surfaces in contact thereby producing a neat, uniform appearance without blistering or buckling. Heretofore attempts to produce such material have resulted in a product with a blistered and uneven surface. The new material is intended for use primarily in making apparel belts but its use is not limited to this purpose as it is suitable for many things, such as shoe gores, in which an elastic leather is desirable.

Figure 1:
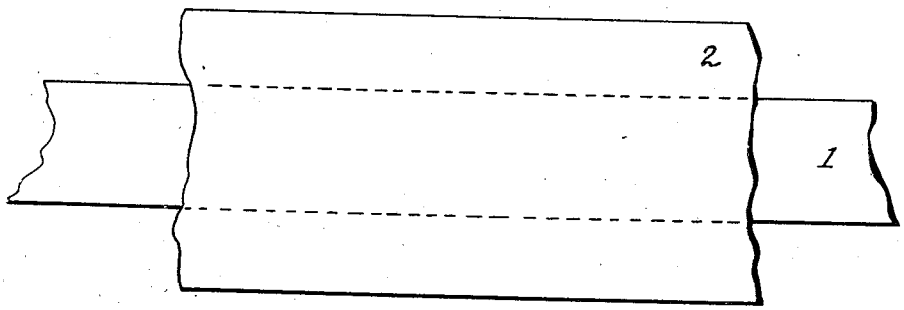
Figure 2:
Figure 3:
Figure 4:
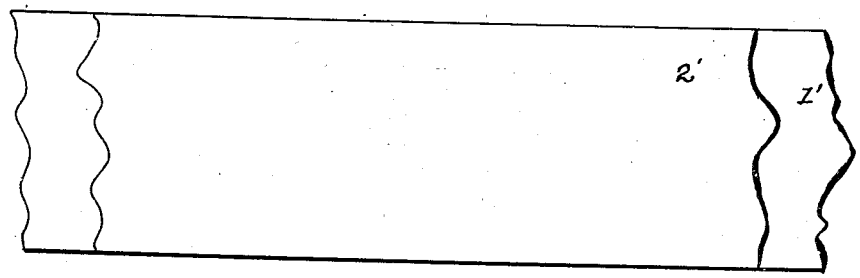
Figure 5:
Figure 6:
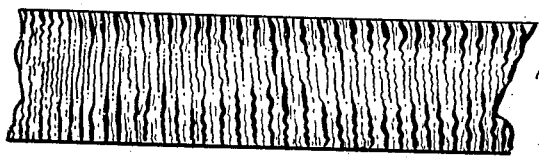

In the drawing Figure 1 is a view of one stage of manufacture of the material; Fig. 2 a longitudinal sectional view of the structure of Fig. 1; Fig. 3 a cross section of an apparel belt made of the material of Figs. 1 and 2; Fig. 4 a view of a modified form of belt material; Fig. 5 a cross sectional view of a belt made of the material shown in Fig. 4; and Fig. 6 a face view of a portion of the finished material.

One way to make my material is to take a piece of elastic material such as a strip of webbing with longitudinal elastic or rubber cords therein, marked 1, and impregnate or coat the same with a suitable size which may be permitted to dry. A strip of webbing of this character consists of a plurality of individual rubber strands which are held together by inclosing threads united in a transverse direction by cross threads so as to form a completed webbing. When such webbing is impregnated and sized it is the threads rather than the rubber component which is thus impregnated and when later the facing of a normally non-elastic sheet such as leather is cemented to the webbing it is with the threads of the webbing rather than with the rubber strands that a multiplicity of adhering contacts minutely spaced apart are formed which points of contact are tensionally drawn close together by the retraction of the webbing from its initially stretched adhering position. In this way the rubber itself is allowed a freedom of motion and of adjustability with respect to various strains upon the belt or other structure and the rubber may exercise these capacities without disrupting the union between the threads of the webbing and the non-elastic facing, thereby avoiding objectionable blistering or buckling between the elastic and non-elastic components as well as the formation of irregular and protruding ridges or wrinkles on the surface of the facing. A soft leather 2 is also sized with a suitable size such as thin rubber solution and dried. I have found that thin glue serves as a size for the webbing and thin rubber solution as a size for the leather but do not limit myself to these materials. The sized fabric 1 is then stretched and coated with a suitable elastic cement and the sized leather is also coated with the suitable cement and stretched to its limit. The leather is then laid on the foundation and the two pressed into intimate contact so that adhesion occurs over the entire surfaces in contact and the cement is permitted to set while the fabric and leather are maintained under tension. It is obvious that if rubber cement is used as the sizing the operation of sizing and cementing may be a single one but if different sizes and cements are used the operations will be consecutive. After the cement has set the tension on the composite fabric is released and the material shrinks to the normal length of the finished product.

By stretching the foundation fabric to its limit of elasticity and the leather not quite to its limit of elasticity the finished product will be of such nature that it cannot be sufficiently stretched in use to break the leather as might be the case if the fabric were originally stretched partially and applied to the leather in which event the leather would be stretched past its breaking point before the foundation fabric reached its limit of elasticity.

If desired only one of the materials may be coated with cement although the best results are obtained by coating both. I have also found that sizing the woven elastic fabric alone will enable adhesion to occur between the surfaces in contact when the cement is applied but the results have not been satisfactory unless both materials are sized.

Where the materials have been sized as hereinabove explained, the structure is thus composed of substantially four layers: the leather, the size or cement between the leather and the webbing threads, the webbing threads, and the rubber core.

I have also found that by varying the tension on the elastic foundation or varying the thickness of the leather I obtain simulations of natural grains upon perfectly smooth leathers. The greater the tension on a given leather the coarser the grain of the resultant product or a thicker leather with a given tension the coarser the grain. I have also found that the natural grain of grained leathers is enhanced in like manner that is, the more the elastic foundation is stretched with a given grain leather the greater the enhancement of the grain.

In preparing the material to make a covered belt of single thickness as shown in Figs. 1, 2 and 3 the fabric 1 is sized, stretched and has the cement applied and is covered with the sized, cement coated leather 2, wider than the fabric. The leather is then turned over the edges of the fabric and secured to the back in the same manner that it was secured to the front resulting in the product shown in cross section in Fig. 3.

Instead of completely covering the back of the webbing the edges of the leather may extend slightly over the edges of the fabric and this material used to make the type of belt shown in Figs. 4 and 5 in which the longitudinal edges of the composite fabric are sewed together at 3 and the webbing 1' cemented together with the leather facing 2' on the outside making the integral structure shown in Fig. 5.

It has been found from many experiments that unless the elastic fabric, and preferably the leather too, is sized preparatory to cementing them together that the leather will pucker up and draw away from the foundation in spots making an unsightly and uncommercial product.

As explaining the phenomenon that a normally non-elastic sheet such as leather may be affected by the process as herein described, this is presumably due to the fact that such sheets though non-elastic in composition are nevertheless composed of a multiplicity of very finely interlaced fibers. When a connection such as is formed between the sheaths which inclose the rubber and the inner surface of the facing is made, this connection being between the rubber inclosing thread on the one hand and the inner fibers of the facing on the other (especially where an elastic cementing layer interposes between the two) gives the fine filamentary constituents of the united fibrous structure an opportunity to rearrange their positions relatively to each other according to the particular degree of tension which may be operative in any particular part of the rubber strands as they retract after the uniting process is completed. The inner fibers of the facing naturally take up a greater part of this strain, leaving the outer fibers a greater freedom of adjustment to the new conditions created by the contracting action of the rubber on the fibers.

I claim:—

1. An elastic leather composed of a foundation of elastic webbing material impregnated with a suitable size, a facing of leather also impregnated with a size and cemented to the elastic material while both are under tension, the entire surfaces in contact being firmly united.

2. An elastic leather structure composed of a foundation of webbed elastic fabric impregnated with a size, a facing of leather also impregnated with a size and cemented to the fabric while both are under tension the entire surfaces in contact being firmly united, the composite material being folded over with the leather on the outside and the fabric cemented together whereby an integral structure is produced.

3. An elastic structure composed of a foundation of elastic webbing comprising a plurality of individual rubber strands held together by inclosing threads to form a surfacing layer thereon, the thread portions of said webbing being impregnated with a size, a facing which consists of a normally non-elastic fibrous sheet cemented to the webbing material while both are under tension, the entire surfaces in contact being firmly united.

4. An elastic leather having a crinkled grain composed of a foundation of webbed elastic fabric impregnated with a size a facing of soft, smooth-faced leather cemented to the fabric while both are under tension, the entire surfaces in contact being firmly united, whereby the leather assumes the simulation of a natural grain on the removal of the tension.

5. An elastic structure composed of a foundation of elastic webbing comprising a plurality of individual transversely connected rubber strands held together by inclosing threads to form a surfacing layer thereon, the thread portions of said webbing being impregnated with a size, a facing which consists of a normally non-elastic fibrous sheet and a cementing layer between it and the threads composing the webbing, the points of permanent adhesion between said sheets and said facing being in the condition of points tensionally drawn close together by the retraction of the webbing from an initial stretched uniting position, the entire surface in contact being firmly united and the resultant product being free from blisters and wrinkles.

6. The process of making elastic leather consisting in treating a foundation of webbed elastic fabric with a size, stretching the webbed elastic fabric to its limit of elasticity, treating a leather facing with a size and stretching it slightly under its limit of elasticity, and uniting the two while both are under tension.

7. The process of making elastic leather consisting in impregnating a foundation of webbed elastic fabric with a size, impregnating a leather facing with a size, stretching the fabric and leather, applying a coat of elastic cement and uniting the two while both are under tension.

In testimony whereof I have hereunto subscribed my name in the presence of two attesting witnesses.

MAURICE SCHEUER.

Witnesses:
  ROBT. B. KILLGORE,
  D. MINTZ.